April 5, 1966 H. M. BROWN ET AL 3,244,610

TAMPED CONNECTIONS

Filed Nov. 29, 1961

INVENTORS
HOWARD M. BROWN
THOMAS R. PEZZACK

BY John F. Hohmann
ATTORNEY

United States Patent Office 3,244,610
Patented Apr. 5, 1966

3,244,610

TAMPED CONNECTIONS

Howard M. Brown and Thomas R. Pezzack, Toronto, Ontario, Canada, assignors to Union Carbide Canada Limited, a corporation of Canada Filed Nov. 29, 1961, Ser. No. 155,700
5 Claims. (Cl. 204—279)

Figure 1:
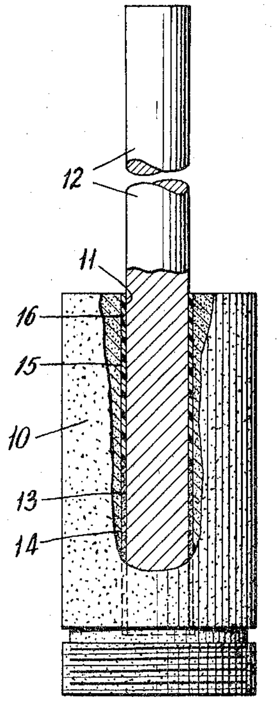

This invention relates to tamped connections, and more particularly, it relates to an improved type of connection between an electrical conductor and a lead-in terminal for an electrolytic cell.

In the art, electrical conductors are fastened to lead-in rods of electrolytic cells by numerous kell-known industrial methods and techniques. For example, electrical conductors are connected rather commonly to the lead-in rods of electrolytic cells mechanically by means of clamping to the top of the lead-in rods. This contact area is at a remote distance from the anode plate of the cell and consequently the high amperage current used in electrolytic cells must travel long distances through the carbonaceous lead-in rods in order to reach the anode plate. Due to this method of electrical connection, substantial power losses occur in the electrolytic cell, since its inherent design requirements cause the connection to be made near the top of the lead-in rod.

Another common type of electrical connection is provided by means of a threaded copper conductor and a tapped lead-in rod. Such a connection is poor and has high contact resistance since the threaded copper conductor is difficult and quite expensive to thread.

Another method of connection is by soldering. This type of connection is quite common for making contact to the lead-in rods of chlorine cells. A disadvantage of this type of construction has been its contact resistance which is initially poor and which increases almost linearly with time on exposure to cell temperatures which are normally of the order of 80° C.–90° C. Therefore the voltage drop across the connection also rises proportionately with the increased resistance causing higher temperature, increased power losses and lower cell efficiency. Because of galvanic corrosion between the copper conductor, carbonaceous lead-in rod and the soldered connection, it is necessary to moisture-proof the lead-in rod by impregnating the rod with a suitable resin. However, due to the necessity of heat in connection with the soldering operation, it is impractical to use an oil or resin impregnated stock for the lead-in rod since the impregnating substance would vaporize. Consequently, the impregnation must be done after the connection is complete. Frequently, a sharp increase in contact resistance across the connection is experienced after impregnation. This increase can take place even before the connection is put into service and subjected to cell temperatures and apparently results from the impregnation operation. In any event, the contact resistance of a soldered connection invariably increases after exposure to cell operating conditions. In addition, experience has shown that a soldered connection may lose its bond with the carbonaceous material if it is subjected to vibrations. Any degree of vibrations seem to affect the solder on setting in some way as to result in a high resistance reading across the soldered connection. Also a soldered connection usually requires some additional mechanical bond to prevent the soldered connection from weakening when vibrated. Since it is practically impossible if not economically prohibitive to obtain vibration-free facilities in an industrial plant, high contact resistance and low mechanical strength of such soldered connections are the end result.

It is therefore the principal object of this invention to provide an improved high strength connection between an electrical conductor and a lead-in rod of an electrolytic cell.

Another object is to stabilize and make more uniform the contact resistance of the subject connection with respect to time.

These objects are achieved by the invention which comprises a connection which utilizes a tamped copper composition such as copper powder or copper amalgam. Although copper powder or copper amalgam has been utilized by the electrical industry for attaching a flexible braided wire cable to a carbonaceous brush for use on electrical machinery, this type of connection has never been considered feasible for use in electrolytic cells.

Figure 2:
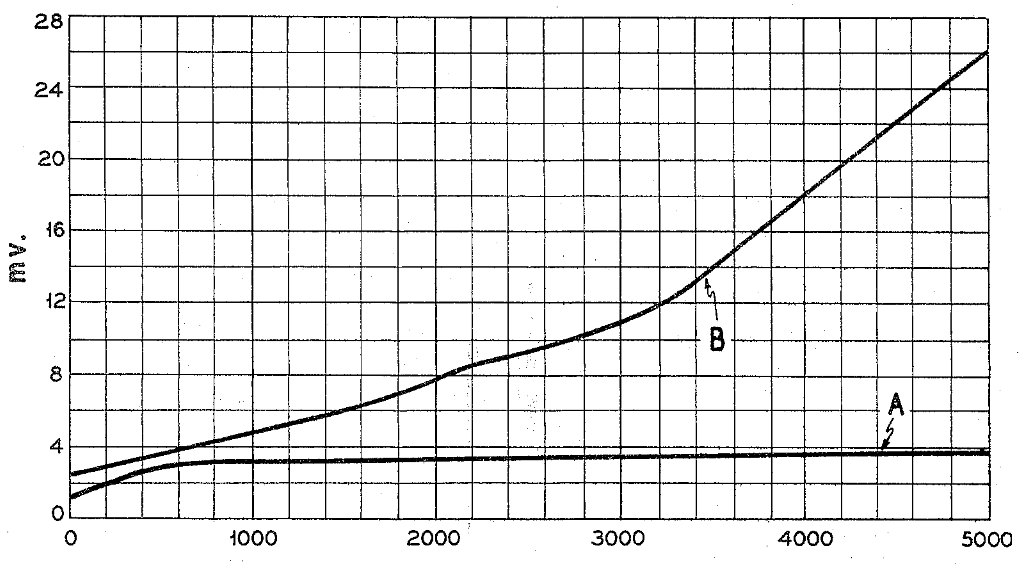

In order that the invention may be more readily understood, reference is made to the accompanying drawing, in which:

FIG. 1 is a partial cross-sectional side view of a typical connection of the invention; and FIG. 2 is a set of curves which compare the change in voltage with respect to operating time of a connection embodying the principles of the invention with a soldered connection of the prior art, when the current is held constant.

Referring now to the drawing and particularly to FIG. 1, there is shown a lead-in rod connection employing the principles of the invention and as used in a chlorine cell. The lead-in rod 10 is made of a carbonaceous material which is impregnated with oil or resin and it is provided with a recess 11. One end of an electrical conductor 12 is inserted into the recess 11 thus forming an annulus since the diameter of the conductor 12 is slightly smaller than the diameter of the recess 11. A copper composition 13 such as copper powder or copper amalgam occupies the annular space between the conductor 12 and the lower portion 14 of the recess 11 and secures the conductor 12 to the lead-in rod 10. The upper portion 15 of the annular space situated above the copper composition 13 is sealed with a moisture impervious substance 16 such as an epoxy resin.

Copper powder of the nodular type is preferred, and when using copper amalgam, the preferred range of proportions is about 61 percent copper powder and 39 percent mercury. The preferred copper composition is copper powder since it has better voltage stability and a lower long term voltage drop across the connection than copper amalgam has even though it does have a slightly higher initial voltage drop than the amalgam. In addition the copper powder is somewhat more economical than copper amalgam due to the high cost of mercury.

In the making of this type of connection, the electrical conductor 12 is inserted into the recess 11, copper composition 13 is supplied to the lower portion 14 of the annular space formed due to the relative diameters of the conductor 12 and the recess 11, and by a succession of light or medium blows, the copper composition 13 is tamped in and down into the annulus thereby securing the conductor 12 to the lead-in rod 10. Preferably a tool is used to expeditiously practice the invention. When the tool is used it would be such that it centers and aligns the conductor 12 in the recess 11 of the lead-in rod 10 and has means for supplying the copper composition 13 gradually or in steps so that the copper composition 13 can be tamped simultaneously or in layers either manually or mechanically. The upper portion 15 of the annular space above the copper composition is filled with a moisture impervious substance 16 such as an epoxy resin in order to provide additional sealing protection to the connection.

The connection has a great deal of strength as made, but complete setting of the amalgam is not achieved for up to 24 hours, at which time it has its final strength.

The strength of such tamped connections is considerably high, and is confirmed by the following results.

A one inch diameter smooth copper conductor was connected by tamped copper amalgam to a carbonaceous block having a smooth hole six inches deep and 1.156 inches in diameter. The copper conductor was clamped in a test fixture and the loads were applied axially to the carbonaceous block. The connection was subjected to loads up to 770 pounds without any apparent axial deflection of the block from the conductor, thus indicating that the connection did not fail nor weaken.

Such tamped connections have been made successfully using metallic conductors of various kinds, shapes and sizes. The depth of the recess for the connection can be as desired and depths of 48 to 50 inches have been used. The greater the depth of the connection in the lead-in rod, the less is the distance the current must travel along the rod, and therefore the power losses through the rod will be minimized.

To illustrate the stability of the contact resistance of this connection when compared to identical conductors and lead-in rods (test specimens) connected by solder, such test specimens were stored in air at a constant temperature of 95° C. for 5000 hours, and during this time they were periodically removed, allowed to cool to room temperature and voltage drop measurements were taken across each connection. The voltage drop measurements were take at a constant 200 ampere load and the results are shown in FIG. 2. The curves are plotted using the voltage drop across the connections in millivolts as ordinate and the time in hours as abscissa. The voltage recordings were made by observing a meter which was jumped across the connections with probes that were positioned in the same area for all the test specimens. Readings were taken at periodic intervals and each of these readings represented an average reading of the three test specimens of each type connection. The curve A is for the tamped connection and curve B is for the soldered connection.

It is apparent from FIG. 2 that the curve A representing the tamped connection provides a constant voltage drop for a sustained period of time. In fact, the resistance stabilizes after about the first 500 hours of operation since the voltage readings thereafter indicate no further resistance change. Contrariwise, the curve B increases positively with the rate of change of its slope from about 0.2 for the first 2500 hours to approaching 1 at 5000 hours. This increase in the resistance will shorten the life of the rod since it causes higher voltage and higher temperatures.

Another advantage of the low contact resistance of tamped connections when compared to identical lead-in rods (test specimens) connected by the solder is the greater uniformity and repeatability of the initial voltage drop across the connections. The voltage drop across the connections of a number of samples of both test specimens was measured at 100 amperes and the resultant statistical parameters of the sampling are tabulated below.

| | Tamped amalgam connection | Soldered connection |
|---|---|---|
| Number of samples | 41 | 42 |
| Arithmetic mean (average), millivolts | 3.3 | 7.87 |
| Highest voltage drop, millivolts | 4.0 | 23.0 |
| Lowest voltage drop, millivolts | 2.7 | 4.3 |
| Range, millivolts | 1.3 | 18.7 |
| Standard deviation | 0.316 | 3.63 |
| Variance | 0.0999 | 13.1769 |

The data illustrates that the voltage drop from sample to sample of the tamped connections is initially lower and much more uniform than the soldered connections.

The connection of the invention is illustrated to be that of one utilized in a typical mercury type chlorine cell. However, it will be appreciated to those skilled in the art that this type of connection is also suitable for other cells of the electrolytic industry such as chlorate cells.

What is claimed is:

1. A lead-in rod assembly for use in electrolytic cells, said lead-in rod assembly comprising an electrical conductor one end of which is embedded within a recess in said lead-in rod, and secured thereto by tamped copper amalgam thus forming a low resistance electrical connection.

2. A lead-in rod assembly for use in electrolytic cells, said lead-in rod assembly comprising an electrical conductor one end of which is embedded within a recess in said lead-in rod and secured thereto by tamped copper amalgam, thus forming a low resistance electrical connection, said connection being sealed by an epoxy resin.

3. The lead-in rod assembly of claim 2 wherein said copper amalgam comprises about 61 percent copper and 39 percent mercury.

4. A method of connecting an electrical conductor to a lead-in rod of an electrolytic cell, which comprises inserting one end of said conductor into a recess in said lead-in rod, dispensing a copper amalgam composition in the lower portion of an annular space formed by the relative diameters of said conductor and said recess in a plurality of small amounts, and tamping said composition after each deposit thus forming a low resistance electrical connection and sealing said connection by dispensing a moisture impervious substance in the upper portion of said annular space.

5. The method of claim 4 wherein said composition is nodular copper powder.

References Cited by the Examiner

UNITED STATES PATENTS

| | | | |
|---|---|---|---|
| 667,421 | 2/1901 | Blackman | 204—286 |
| 1,863,429 | 6/1932 | Willmore | 339—278 |
| 2,655,641 | 10/1953 | Asaff | 339—278 |
| 2,967,142 | 1/1961 | Oliver | 204—266 |
| 3,043,755 | 7/1962 | Schmitt | 204—294 |

FOREIGN PATENTS 19,368 1902 Great Britain.

JOHN H. MACK, *Primary Examiner.*

D. R. JORDAN, *Assistant Examiner.*